(12) United States Patent
Lee et al.

(10) Patent No.: US 11,515,544 B2
(45) Date of Patent: Nov. 29, 2022

(54) METHOD OF MANUFACTURING SOLID OXIDE FUEL CELL USING CALENDARING PROCESS

(71) Applicant: KOREA INSTITUTE OF SCIENCE AND TECHNOLOGY, Seoul (KR)

(72) Inventors: Hae-Weon Lee, Seoul (KR); Ho Il Ji, Seoul (KR); Byung Kook Kim, Seoul (KR); Jong Ho Lee, Seoul (KR); Ji-Won Son, Seoul (KR); Kyung Joong Yoon, Seoul (KR); Hyoungchul Kim, Seoul (KR); Sungeun Yang, Seoul (KR); Sangbaek Park, Seoul (KR); Junseok Kim, Seoul (KR); Jisu Shin, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/815,871

(22) Filed: Mar. 11, 2020

(65) Prior Publication Data
US 2021/0151773 A1    May 20, 2021

(30) Foreign Application Priority Data

Nov. 14, 2019    (KR) .......................... 10-2019-0145999

(51) Int. Cl.
*H01M 4/88* (2006.01)
*H01M 8/1226* (2016.01)
(Continued)

(52) U.S. Cl.
CPC ....... *H01M 4/8896* (2013.01); *H01M 4/8621* (2013.01); *H01M 4/8828* (2013.01);
(Continued)

(58) Field of Classification Search
None
See application file for complete search history.

(56) References Cited

U.S. PATENT DOCUMENTS

| 4,913,982 A | * | 4/1990 | Kotchick ............ H01M 8/2404 |
| | | | 429/535 |
| 10,418,631 B2 | | 9/2019 | Beneventi et al. |

FOREIGN PATENT DOCUMENTS

| JP | 2019-160516 A | 9/2019 |
| KR | 10-0958514 B1 | 5/2010 |

(Continued)

OTHER PUBLICATIONS

W. Ellingson, nondestructive characterization methods for monolithic solid oxide fuel cells, Argonne National Laboratory ANL-92/24 Electrochemical Technology Program and Materials and Components Technology Division (Year: 1993).*

(Continued)

*Primary Examiner* — Lucas J. O'Donnell
(74) *Attorney, Agent, or Firm* — Goldilocks Zone IP Law

(57) ABSTRACT

Disclosed is a method of manufacturing a solid oxide fuel cell using a calendering process. The method includes preparing a stack including an anode support layer (ASL) and an anode functional layer (AFL), calendering the stack to obtain an anode, stacking an electrolyte layer on the anode to obtain an assembly, calendering the assembly to obtain an electrolyte substrate, sintering the electrolyte substrate, and forming a cathode on the electrolyte layer of the electrolyte substrate.

14 Claims, 15 Drawing Sheets

(51) Int. Cl.
  *H01M 4/90*  (2006.01)
  *H01M 4/86*  (2006.01)
  *H01M 8/248*  (2016.01)
  *H01M 8/1253*  (2016.01)
  *H01M 8/12*  (2016.01)

(52) U.S. Cl.
  CPC ....... *H01M 4/8885* (2013.01); *H01M 4/9066* (2013.01); *H01M 8/1226* (2013.01); *H01M 8/1253* (2013.01); *H01M 8/248* (2013.01); *H01M 2008/1293* (2013.01)

(56) References Cited

FOREIGN PATENT DOCUMENTS

| KR | 10-2013-0043948 A | 5/2013 |
|---|---|---|
| KR | 10-1288407 B1 | 7/2013 |
| KR | 10-2016-0146094 A | 12/2016 |

OTHER PUBLICATIONS

Han et al., Fabrication and properties of anode-supported solid oxide fuel cell, Solid State Ionics 179 (2008) 1545-1548 (Year: 2008).*

Han et al., Fabrication and Characterizations of YSZ Electrolyte Films for SOFC, Key Engineering Materials Online: Mar. 29, 2010 ISSN: 1662-9795, vols. 434-435, pp. 705-709, doi:10.4028/www.scientific.net/KEM.434-435.705 (Year: 2010).*

Junseok Kim et al. Enhanced sinterability and electrochemical performance of solid oxide fuel cells via roll calendering process, Journal of Materials Chemistry A, Mar. 19, 2019, pp. 1-28.

Veronica Moreno et al., Dense YSZ Laminates Obtained by Aqueous Tape Casting and Calendering, Advanced Engineering Materials, 2013, pp. 1014-1018, vol. 15, No. 10.

* cited by examiner

METHOD OF MANUFACTURING SOLID OXIDE FUEL CELL USING CALENDARING PROCESS

CROSS-REFERENCE TO RELATED APPLICATION

This application claims, under 35 U.S.C. § 119(a), the benefit of priority to Korean Patent Application No. 10-2019-0145999 filed on Nov. 14, 2019, the entire contents of which are incorporated herein by reference.

BACKGROUND

(a) Technical Field

The present invention relates to a method of manufacturing a solid oxide fuel cell using a calendering process.

(b) Background Art

Solid oxide fuel cells (hereinafter, referred to as "SOFCs") for converting clean energy at high efficiency are attracting great attention as next-generation energy technology for large-capacity power supply. SOFCs operate within a high temperature range, thus being thermodynamically and kinetically advantageous and having higher efficiency and performance than low-temperature fuel cells.

However, since SOFC systems are very costly, the prices of parts other than stacks can be reduced only with the learning effect of mass production. However, in order to reduce the price of stacks, improvement of the manufacturing yield and power density as well as minimization in facility investment and processing costs are required.

A general process of manufacturing an anode support plate cell used for SOFC stacks is as follows. First, an anode support sheet is formed by tape-casting, and is then compressed using a uniaxial press to form an anode. Then, yttria-stabilized-zirconia (YSZ) is applied to the anode by screen printing to form an electrolyte layer, and sintering is performed at a high temperature of 1,350° C. or higher to form an anode/electrolyte double layer. This process is carried out in a batch process rather than a continuous process that is industrially advantageous for production. In the batch process, equipment and labor costs account for 35% of the stack cost. In addition, with the manufacturing technique based on uniaxial pressing and screen printing, it is difficult to suppress the occurrence of processing defects due to the difference in powder-packing density between the constituent layers. In particular, in the case of manufacturing large-area cells, it is difficult to apply a uniform pressure to the entire area due to the bending of upper and lower plates, which is inevitably caused by the uniaxial pressing equipment. In addition, since only vertical stress is applied, a large stress is required for rearrangement between particles, making it difficult to obtain a uniform packing and interfacial structure and to achieve high packing density. Therefore, it is difficult to produce cells having an ideal microstructure, and furthermore, the electrochemical performance as well as the long-term stability thereof may be deteriorated, and the physical destruction of fuel cells may be caused.

Typically, the final sintering temperature of the anode/electrolyte sintering process is set as the minimum temperature at which structurally dense electrolytes can be obtained. The YSZ electrolyte, produced through a process of printing an electrolyte ink on the anode by screen printing or a process of pressing an electrolyte sheet on the anode by uniaxial pressing, generally requires a sintering temperature of 1,350° C. or higher in both processes. This corresponds to the sintering process that is performed at the highest temperature among sintering processes for producing SOFCs. This high-temperature sintering causes not only an increase in processing time as the temperature increases, but also an increase in initial equipment costs and operation costs of high-temperature sintering equipment, thus acting as a major factor in increasing the price of SOFC cells. In addition, as the sintering temperature increases, the anode of the porous structure becomes dense, the diffusion of reactant is gases is inhibited, and nickel oxide (NiO) and YSZ ceramic powders constituting the anode are excessively sintered, and the size of an electrochemically active reaction area is thus decreased. Thus, it is necessary to lower the sintering temperature of the electrolyte in order to reduce the manufacturing cost of SOFCs and improve the performance thereof. In the case of using a ceramic powder of the same standard, the sintering behavior depends greatly on the packing structure of the powder. That is, as the packing density increases, the contact coordination number between ceramic particles can be increased and the sintering temperature can be effectively reduced. In order to improve the packing density in the process of compressing the sheet by uniaxial pressing, a larger vertical pressure should be applied during the compression process. In this case, the sheet is easily destroyed by the strong vertical stress.

Therefore, in order to improve the production yield and power density and to minimize facility investment and process costs for the purpose of reducing the stack price, it is necessary to lower the sintering temperature by securing a uniform and high packing structure of the electrolyte and an ideal interfacial structures at the process stage.

The above information disclosed in this Background section is provided only for enhancement of understanding of the background of the invention, and therefore it may include information that does not form the prior art that is already known in this country to a person of ordinary skill in the art.

SUMMARY OF THE DISCLOSURE

The present invention has been made in an effort to solve the above-described problems associated with the prior art.

It is one object of the present invention to provide a method of manufacturing an anode having a uniform filling structure without an interface defect and a solid oxide fuel cell including the same.

The aforementioned objects of the present invention as well as other objects will be clearly understood from the following description and could be implemented by means defined in the claims and combinations thereof.

In one aspect, the present invention provides a method of manufacturing a solid oxide fuel cell including preparing a stack including at least one anode support layer and at least one anode functional layer and calendering the stack to obtain an anode.

The anode support layer may include a sheet obtained by tape-casting a slurry including at least nickel oxide (NiO), yttria-stabilized zirconia (YSZ) and a pore-forming agent.

The anode functional layer may include a sheet obtained by tape-casting a slurry including at least nickel oxide (NiO) and yttria-stabilized zirconia (YSZ).

The stack may include five to ten anode support layers including the anode support layer, and at least one anode functional layer disposed on the anode support layers.

The anode may be obtained by calendering the stack under the following conditions:
- calendering rollers have a nip gap not less than 99% and less than 100% of a stack thickness;
- the calendering rollers have a rotational speed of 0.3 times or less per minute;
- the calendering rollers have a temperature of 60 to 90° C.; and
- the calendering rollers have a diameter of 100 mm to 150 mm.

The anode may be obtained by calendering the stack at least two times.

The method may further include stacking an electrolyte layer on the anode to obtain an assembly, and calendering the assembly to obtain an electrolyte substrate.

The electrolyte layer may include a sheet obtained by tape-casting a slurry including yttria-stabilized zirconia (YSZ).

The electrolyte substrate may be obtained by calendering the assembly under the following conditions:
- calendering rollers have a nip gap not less than 90% and less than 95% of a thickness of the assembly;
- the calendering rollers have a rotational speed of 8 times or more per minute;
- the calendering rollers have a temperature of 60 to 90° C.; and
- the calendering rollers have a diameter of 100 mm to 150 mm.

The method may further include sintering the electrolyte substrate.

The electrolyte substrate may be sintered at 1,200 to 1,300° C.

The anode of the electrolyte substrate may have a thickness of 0.6 mm to 1.0 mm and the electrolyte layer may have a thickness of 3 μm to 10 μm.

The method may further include forming a cathode on the electrolyte layer of the electrolyte substrate.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein:

FIG. 11A shows the result of SEM on the surface of the electrolyte layer included in the electrolyte substrate and FIG. 11B shows the result of SEM on the cross-section of the electrolyte substrate;

FIG. 12A shows the result of SEM on the surface of the electrolyte layer included in the electrolyte substrate, and FIG. 12B shows the result of SEM on the cross-section of the electrolyte substrate.

DETAILED DESCRIPTION

Figure 1:
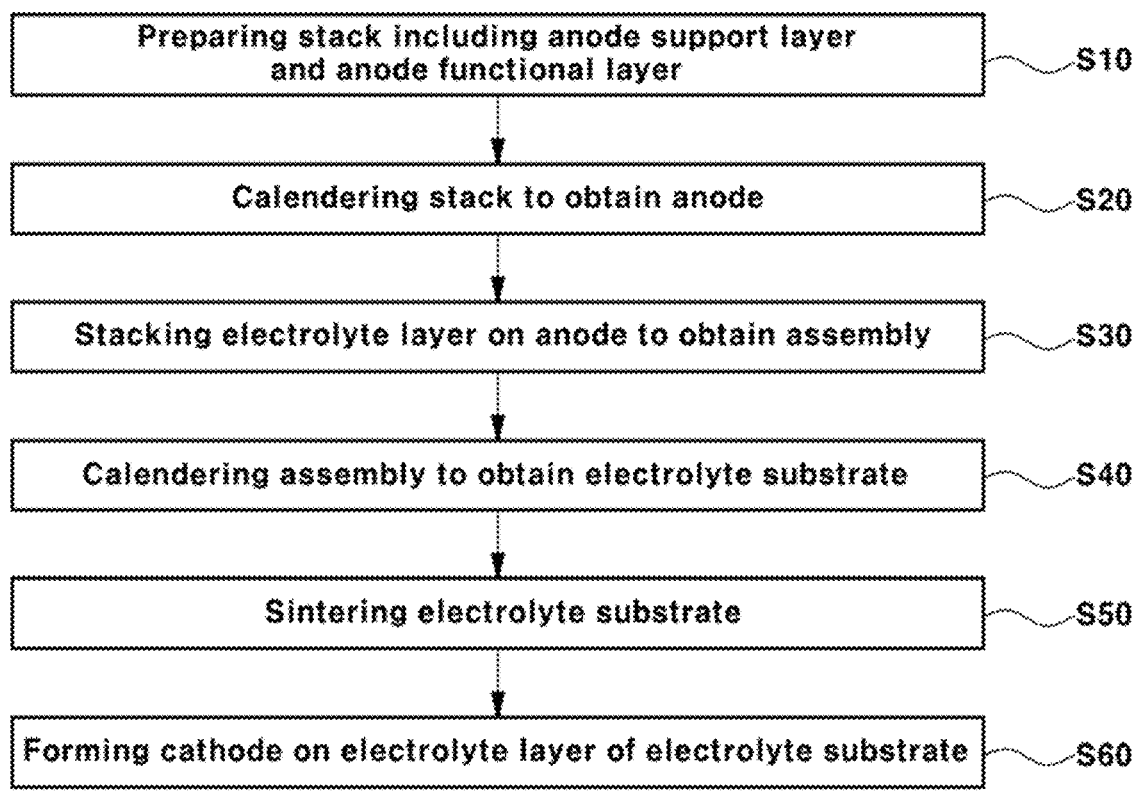
FIG. 1 is a flowchart illustrating a method of manufacturing a solid oxide fuel cell according to the present invention.

The objects described above, and other objects, features and advantages will be clearly understood from the following preferred embodiments with reference to the attached drawings. However, the present invention is not limited to the embodiments, and will be embodied in different forms. The embodiments are suggested only to offer thorough and complete understanding of the disclosed context and to sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the term "comprises" or "has", when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also is be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all the numbers, figures and/or expressions. In addition, when numerical ranges are disclosed in the description, these ranges are continuous and include all numbers from the minimum to the maximum including the maximum within the ranges unless otherwise defined. Furthermore, when the range refers to an integer, it includes all integers from the minimum to the maximum including the maximum within the range, unless otherwise defined.

FIG. 1 is a flowchart illustrating a method of manufacturing a solid oxide fuel cell according to the present invention. Referring to this, the manufacturing method includes preparing a stack including an anode support layer (ASL) and an anode functional layer (AFL) (S10), calendering the stack to obtain an anode (S20), stacking an electrolyte layer on the anode to obtain an assembly (S30), calendering the assembly to obtain an electrolyte substrate (S40), sintering the electrolyte substrate (S50), and forming a cathode on the electrolyte layer of the electrolyte substrate (S60).

The technical feature of the present invention is to manufacture the anode and the electrolyte substrate through a calendering process. The calendering process includes passing a subject between a pair of calendering rollers to apply a linear pressure to the subject. In this process, a uniform linear pressure is continuously applied from one end of the subject to the other end thereof. Therefore, uniform stress is applied regardless of the width and length of the subject. Thus, unlike conventional uniaxial pressing processes, processing defects such as interfacial delamination between the respective components of the anode, the electrolyte substrate and the like and non-uniform packing density between positions are suppressed. In addition, since the packing density is increased, the sintering temperature for obtaining a dense electrolyte layer can be lowered.

The technical features of the present invention as described above will be understood in more detail from the description of respective steps below.

Figure 2:
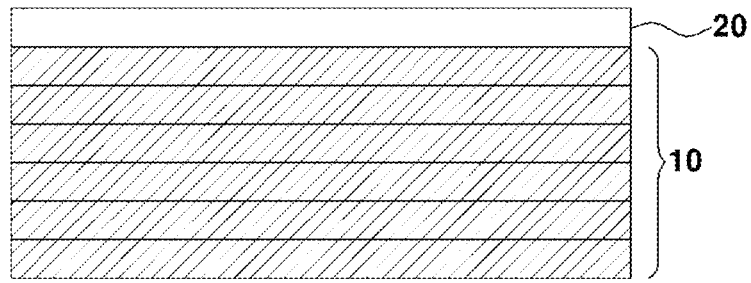
FIG. 2 is a schematic diagram showing a stack according to the present invention.

FIG. 2 schematically shows a stack 30a. Here, the stack 30a may include at least one anode support layer ASL 10 and at least one anode functional layer AFL 20. FIG. 2 shows a stack 30a including six anode support layers 10 and one anode functional layer 20 which are stacked, but the stack 30a according to the present invention is not limited thereto. The number of respective layers can be adjusted as desired.

The anode support layer 10 may include a sheet obtained by tape-casting a slurry including at least nickel oxide (NiO), yttria-stabilized zirconia (YSZ) and a pore-forming agent. By stacking a plurality of sheets including the sheet, the anode support layer 10 shown in FIG. 2 can be obtained.

The number of stacked layers constituting the sheet is not particularly limited, but the anode support layer 10 is preferably formed as five to ten layers in order to secure the mechanical strength of the anode 30b to be described later.

The pore-forming agent functions to form pores in the anode support layer, and the type thereof is not particularly limited. For example, the pore-forming agent may include polymethylmethacrylate (PMMA).

In addition, the slurry may include a solvent selected from the group consisting of alcohol solvents such as methanol, ethanol, propanol and butanol, BTX solvents such as benzene, toluene and xylene, and combinations thereof.

In addition, the slurry may further include at least one additive such as a binder for improving the binding force between respective components, a dispersant for improving dispersibility, or a plasticizer for improving workability.

The anode functional layer 20 may include a sheet obtained by tape-casting a slurry including at least nickel oxide (NiO) and a pore-forming agent.

The slurry may include a solvent selected from the group consisting of alcohol solvents such as methanol, ethanol, propanol and butanol, BTX solvents such as benzene, toluene and xylene, and combinations thereof.

In addition, the slurry may further include at least one additive such as a binder for improving the binding force between respective components, a dispersant for improving dispersibility, or a plasticizer for improving workability.

Figure 3:
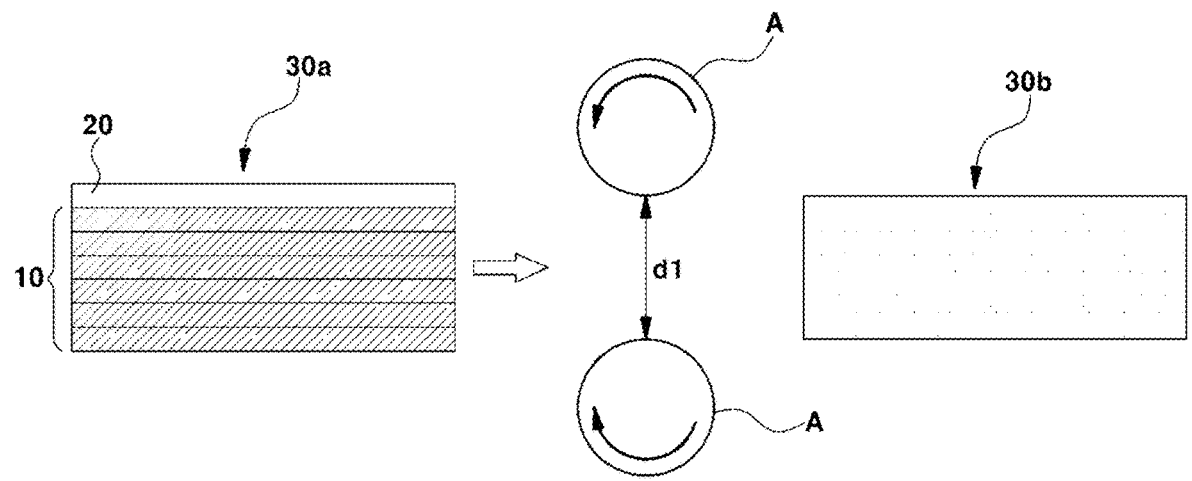
FIG. 3 is a schematic diagram showing calendering of the stack according to the present invention to obtain an anode.

FIG. 3 schematically illustrates calendering of the stack 30a to obtain an anode 30b (S20). Referring to this, the anode 30b can be obtained by passing the stack 30a through a pair of calendering rollers A to press the same.

Here, in order to remove the discontinuous interface between the respective sheets without physically destroying the stack 30a, the stack 30a should be calendered under specific conditions.

Specifically, the process of calendering the stack 30a is preferably carried out such that a nip gap d1 of the calendering roller A is within a range not less than 99% but less than 100% of the thickness of the stack 30a. When the nip gap is less than 99% of the thickness of the stack 30a, the stack 30a may be physically destroyed. Thus, it is preferable to calender the stack 30a under somewhat mild conditions.

In addition, the rotational speed of the calendering roller A is preferably 0.3 times per minute or less. When the rotational speed of the calendering roller A exceeds 0.3 times, the stack 30a may be damaged due to excessively fast rotation.

The temperature of the calendering roller A is preferably 60° C. to 90° C. and the diameter of the calendering roller A is preferably 100 mm to 150 mm. When the is temperature and diameter fall within the above numerical ranges, it is possible to more effectively eliminate the discontinuous interface between the sheets.

The process of calendering the stack 30a may be performed at least two times. In this case, the calendering process may be performed while rotating the stack 30a by about 90°.

In addition, during calendering of the stack 30a, a protective layer may be stacked on at least one surface of the stack 30a to prevent damage to the stack 30a. The protective layer is not particularly limited, and may be a heat-resistant sheet such as a polyimide film. In the case of stacking the protective layer, the nip gap d1 of the calendering roller A is adjusted to a range of not less than 99% but less than 100% of the thickness of the stack 30a on which the protective layer is stacked. The protective layer may be removed after finishing the process of calendering the stack 30a.

Figure 4:
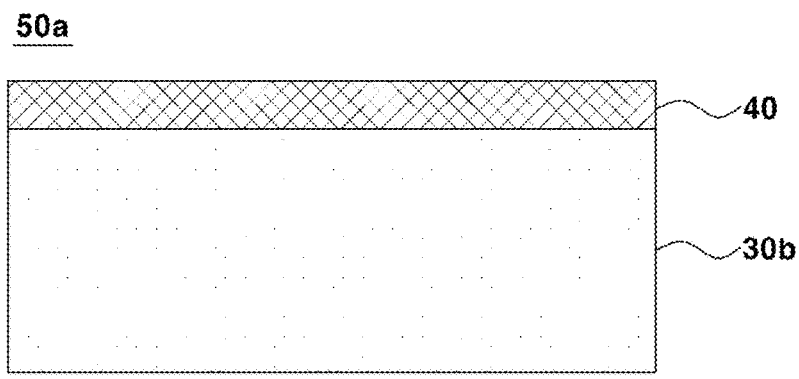
FIG. 4 is a schematic diagram showing an assembly according to the present is invention.

FIG. 4 schematically shows the assembly 50a. Referring to this, the assembly 50a can be obtained by stacking the electrolyte layer 40 on the anode 30b (S30).

The electrolyte layer 40 may include a sheet obtained by tape-casting a slurry including yttria-stabilized zirconia (YSZ).

The slurry may include a solvent selected from the group consisting of alcohol solvents such as methanol, ethanol, propanol and butanol, BTX solvents such as benzene, toluene and xylene, and combinations thereof.

In addition, the slurry may further include at least one additive such as a binder is for improving the binding force of each component, a dispersant for improving dispersibility, or a plasticizer for improving workability.

The method of stacking the electrolyte layer 40 is not particularly limited, and for example, the sheet may be stacked on the anode 30b by transferring the sheet thereto.

Figure 5:
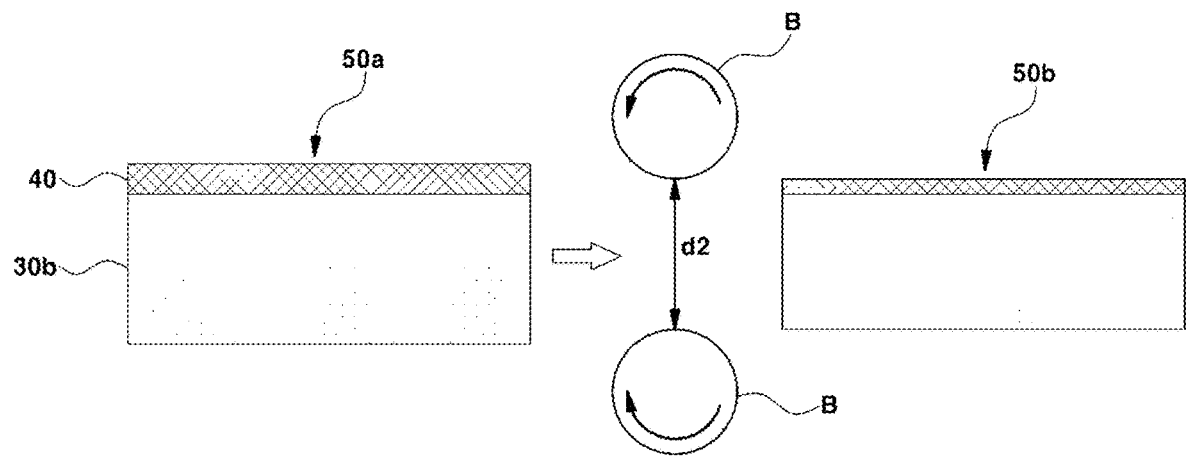
FIG. 5 is a schematic diagram showing calendering the assembly according to the present invention to obtain an electrolyte substrate.

FIG. 5 schematically shows calendering the assembly 50a to obtain an electrolyte substrate 50b (S40). Referring to this, the electrolyte substrate 50b can be obtained by pressing the assembly 50a while passing the assembly 50a through a pair of calendering rollers B.

In order to remove the discontinuous interface between the anode 30b and the electrolyte layer 40 and to improve the filling density of the electrolyte layer 40, the calendering of the assembly 50a is preferably performed under strict conditions compared to the calendering of the stack 30a.

Specifically, the process of calendering the assembly 50a may be performed under the condition that the nip gap d2 of the calendering roller B is within a range of 90% to 95% of the thickness of the assembly 50a. When the nip gap is less than 90% of the thickness of the assembly 50a, the applied linear pressure may be too strong, causing damage to the assembly 50a. On the other hand, when the applied linear pressure exceeds 95%, it may be difficult to improve the interface characteristics between the anode 30b and the electrolyte layer 40 and the filling density of the electrolyte layer 40 to a desired level.

In addition, the rotational speed of the calendering roller B is preferably at least 8 times per minute. The upper limit of the rotational speed of the calendering roller B is not particularly limited, but is preferably up to about 20 times per minute in consideration of the degree of improvement of the effect due to the increase in the rotational speed and the damage caused by friction between the assembly 50a and the calendering roller B.

The temperature of the calendering roller B is preferably 60° C. to 90° C., and the diameter of the calendering roller is preferably 100 mm to 150 mm. When the temperature and diameter fall within the above numerical ranges, the discontinuous interface between the anode 30b and the electrolyte layer 40 can be more effectively removed.

Then, the electrolyte substrate 50b may be sintered (S50). According to the present invention, the interface between the sheets included in the electrolyte substrate 50b is removed by the above-described calendering process, and the packing density of the electrolyte layer 40 is greatly improved. Therefore, it is not necessary to set the sintering temperature for the electrolyte substrate 50b to a high temperature, as in conventional cases. The reason for this is that, even when sintered at a lower temperature, a structure having a density the same as or greater than that of conventional cases can be obtained.

Specifically, the electrolyte substrate 50b may be sintered at 1,200° C. to 1,300° C. For reference, "sintering temperature" of electrolyte refers to the highest temperature among the sintering processes. Since the sintering temperature is lowered, processing costs can be reduced, and a reduction in the size of the reaction area due to excessively sintering on nickel oxide (NiO) and the yttria-stabilized zirconia (YSZ) constituting the anode 30b can be prevented.

The thickness of the anode of the sintered electrolyte substrate 50b may be 0.6 mm to 1.0 mm, and the thickness of the electrolyte layer may be 3 μm to 10 μm. However, the thickness of each component can be adjusted as desired, and the thickness of the above-described sheet and the like can be changed according to the adjusted value.

Figure 6:
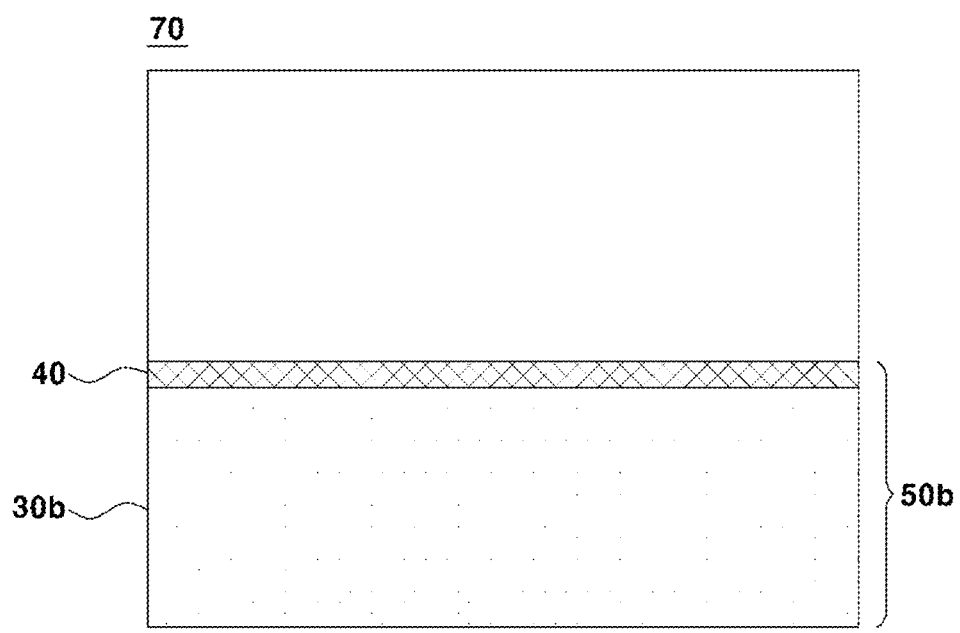
FIG. 6 shows a solid oxide fuel cell obtained by forming a cathode on the electrolyte layer of the electrolyte substrate according to the present invention.

FIG. 6 shows a solid oxide fuel cell 70 obtained by forming a cathode 60 on the electrolyte layer 40 of the electrolyte substrate 50b (S60).

The cathode 60 may be made of a material and have a thickness or the like, which is typical in the art to which the present invention pertains. For example, the cathode 60 includes a cathode functional layer (not shown) including $La_{0.8}Sr_{0.2}MnO_3$ (LSM) and yttria-stabilized zirconia (YSZ), and a cathode support layer (not shown) including $La_{0.8}Sr_{0.2}MnO_3$ (LSM).

The method of forming the cathode 60 is not particularly limited, and may be formed by, for example, applying a material for the cathode 60 to the electrolyte layer 40 by screen printing.

Preparation Example 1—Preparation of Anode Support Layer

Nickel oxide (NiO), yttria-stabilized zirconia (YSZ) and polymethylmethacrylate (PMMA) were mixed at a volume ratio of 28:42:30 to obtain a powder. The powder and a solvent were mixed at a volume ratio of 24:76 to obtain a slurry. In this case, a mixed solvent containing ethanol and toluene was used as the solvent.

2.3 parts by weight of a polyester/polyamine condensation polymer (Hypermer KD-1, ICI chemical Co., Spain) as a dispersant, 9.3 parts by weight of poly(vinyl butyral) (PVB) as a binder, and 9.3 parts by weight of dibutyl phthalate as a plasticizer were added to 100 parts by weight of the slurry. The slurry was ball-milled for about 24 hours and then aged for about 24 hours.

The slurry was tape-cast to obtain an anode support layer sheet.

Preparation Example 2—Preparation of Anode Functional Layer

Nickel oxide (NiO) and yttria-stabilized zirconia (YSZ) were mixed at a volume ratio of 40:60 to obtain a powder. The powder and a solvent were mixed at a volume ratio of 24:76 to obtain a slurry. In this case, a mixed solvent containing ethanol and toluene was used as the solvent.

2.47 parts by weight of a polyester/polyamine condensation polymer ("Hypermer" KD-1) as a dispersant, 9.2 parts by weight of poly(vinyl butyral) (PVB) as a binder, and 8.49 parts by weight of dibutyl phthalate as a plasticizer were added to 100 parts by weight of the slurry. The slurry was ball-milled for about 24 hours and then aged for about 24 hours.

The slurry was tape-cast to obtain an anode functional layer sheet.

Preparation Example 3—Preparation of Electrolyte Layer

An yttria-stabilized zirconia (YSZ) powder and a solvent were mixed at a volume ratio of 9:91 to obtain a slurry. A mixed solvent containing ethanol and toluene was used as the solvent.

2.5 parts by weight of a polyester/polyamine condensation polymer ("Hypermer" KD-6) as a dispersant, 8.7 parts by weight of poly(vinyl butyral) (PVB) as a binder, and 10.5 parts by weight of dibutyl phthalate as a plasticizer were added to 100 parts by weight of the slurry. The slurry was ball-milled for about 24 hours and then aged for about 24 hours.

The slurry was tape-cast to obtain an electrolyte layer sheet.

EXAMPLE

First, an anode was manufactured as follows.

Six anode support layer sheets obtained in Preparation Example 1 and one anode functional layer sheet obtained in Preparation Example 2 were stacked to obtain a stack. The stack was pressed with calendering equipment to produce an anode. The calendering equipment was set such that the nip gap of the calendering roller was adjusted to 99% of the stack thickness and the rotational speed was adjusted to 0.21 to 0.32 times per minute. The calendering roller herein used had a temperature of 75° C. and a diameter of 120 mm. The stack was pressed six times in total using the calendering equipment, and the stack was calendered while rotating the stack 90° each time.

Then, the electrolyte layer of Preparation Example 3 was stacked on the anode and was then pressed with calendering equipment to prepare an electrolyte substrate. The calendering equipment was set such that the nip gap of the calendering roller was adjusted to 92% of the electrolyte substrate thickness and the rotational speed was adjusted to 8 times per minute. The calendering roller herein used had a temperature of 75° C. and a diameter of 120 mm. The electrolyte substrate was pressed six times using the calendering equipment, and the electrolyte substrate was calendered while rotating the electrolyte substrate 90° each time.

The electrolyte substrate was sintered using an electric furnace. The sintering schedules are shown in Table 1 below. The sintering temperature was set to 1,270° C. or lower, which is lower than that of a conventional case.

A cathode was formed on the electrolyte layer of the sintered electrolyte substrate by screen printing. Specifically, a cathode functional layer was formed by screen-printing a composition containing $La_{0.8}Sr_{0.2}MnO_3$(LSM) and yttria-stabilized zirconia (YSZ) four times, and a cathode support layer was formed by screen-printing a composition containing $La_{0.8}Sr_{0.2}MnO_3$(LSM) four times. Upon each application, planarization was performed at room temperature for 30 minutes, and then drying was performed at 60° C. for about 1 hour and 80° C. for about 1 hour. Then, sintering was performed in accordance with the sintering schedule shown in Table 2 below to obtain a solid oxide fuel cell.

TABLE 1

| Starting temperature | Heating time | Heating rate | Retention time |
|---|---|---|---|
| 200° C. | 2 h | 1.5° C./min | 1 h |
| 300° C. | 2 h 30 min | 0.7° C./min | 2 h 30 min |

TABLE 1-continued

| Starting temperature | Heating time | Heating rate | Retention time |
|---|---|---|---|
| 450° C. | 2 h 30 min | 1° C./min | 2 h 30 min |
| 600° C. | 2 h | 1.3° C./min | 2 h |
| 900° C. | 3 h 30 min | 1.3° C./min | 1 h |
| 1270° C. | 6 h | 1° C./min | 4 h |
| 900° C. | 3 h 30 min | 1.3° C./min | 0 |
| 600° C. | 5 h | 1° C./min | 0 |
| 20° C. | 4 h 30 min | 2° C. | 0 |

TABLE 2

| Starting temperature | Heating time | Heating rate | Retention time |
|---|---|---|---|
| 170° C. | 1 h 40 min | 1.5° C./min | 1 h |
| 350° C. | 2 h | 1.5° C./min | 2 h |
| 400° C. | 30 min | 2° C./min | 2 h |
| 1050° C. | 3 h | 1.5° C./min | 3 h |
| 20° C. | 4 h | 2.8° C./min | 0 h |

COMPARATIVE EXAMPLE

A solid oxide fuel cell was manufactured in the same manner as in Example above, except that uniaxial pressing equipment was used, as in the conventional case, rather than calendering equipment.

Experimental Example 1-Structure of Anode

Figure 7A:
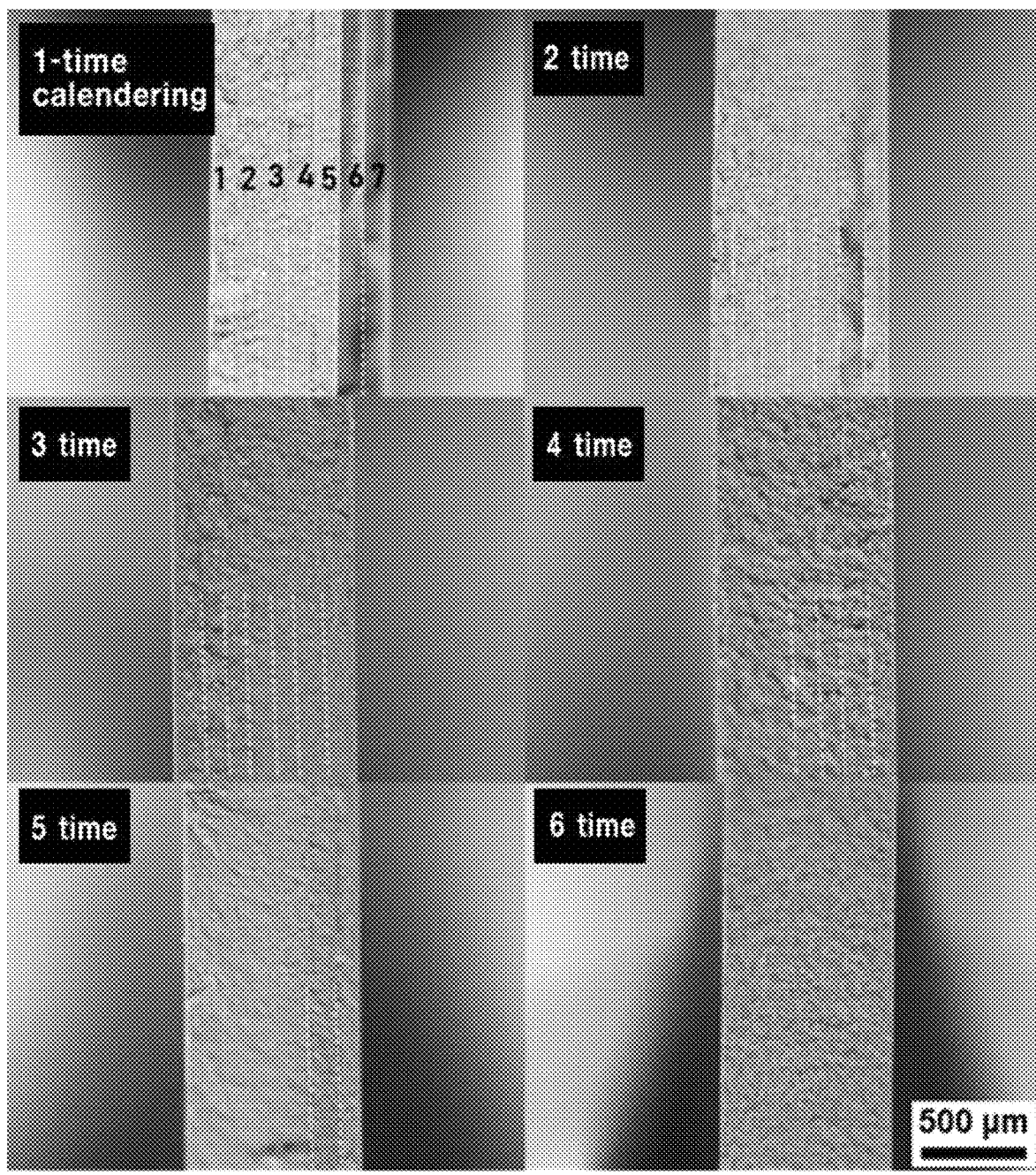
FIG. 7A shows the microstructure of the cross-section of an anode produced in Example according to the present invention depending on the number of times calendering.

The microstructure of the cross-section of the anode produced in Example above depending on the number of times calendering was performed was measured. The result is shown in FIG. 7A. As can be seen from FIG. 7A, as the calendering is repeated, a discontinuous surface between the layers is removed.

Figure 7B:
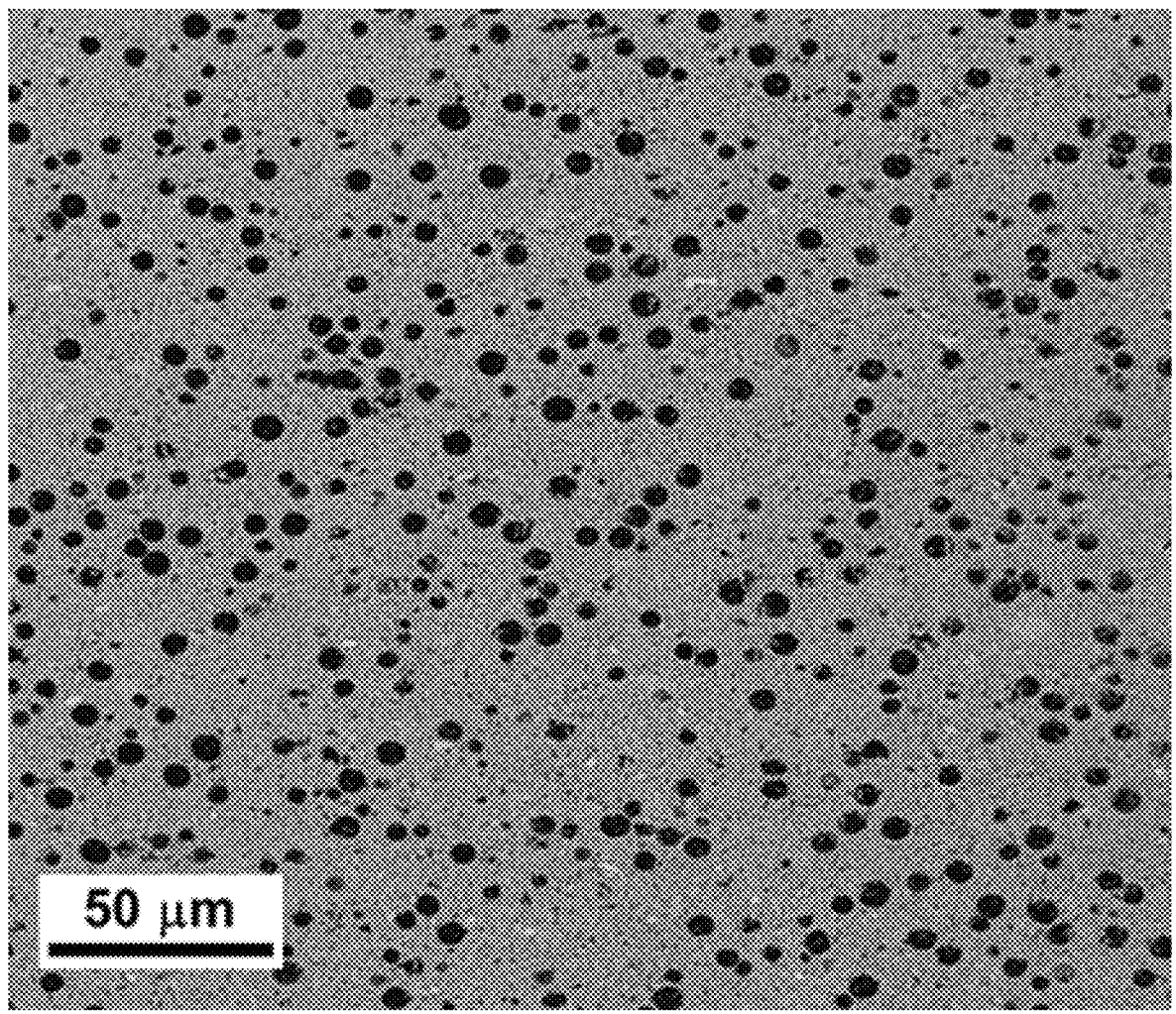
FIG. 7B shows the result of scanning electron microscopy (SEM) on the cross section of the anode produced in Example according to the present invention.

In addition, scanning electron microscopy (SEM) was performed on the cross section of the anode. The result is shown in FIG. 7B. As can be seen from FIG. 7B, the discontinuous surface of the anode is completely removed.

Experimental Example 2—Structure of Electrolyte Substrate

Figure 8:
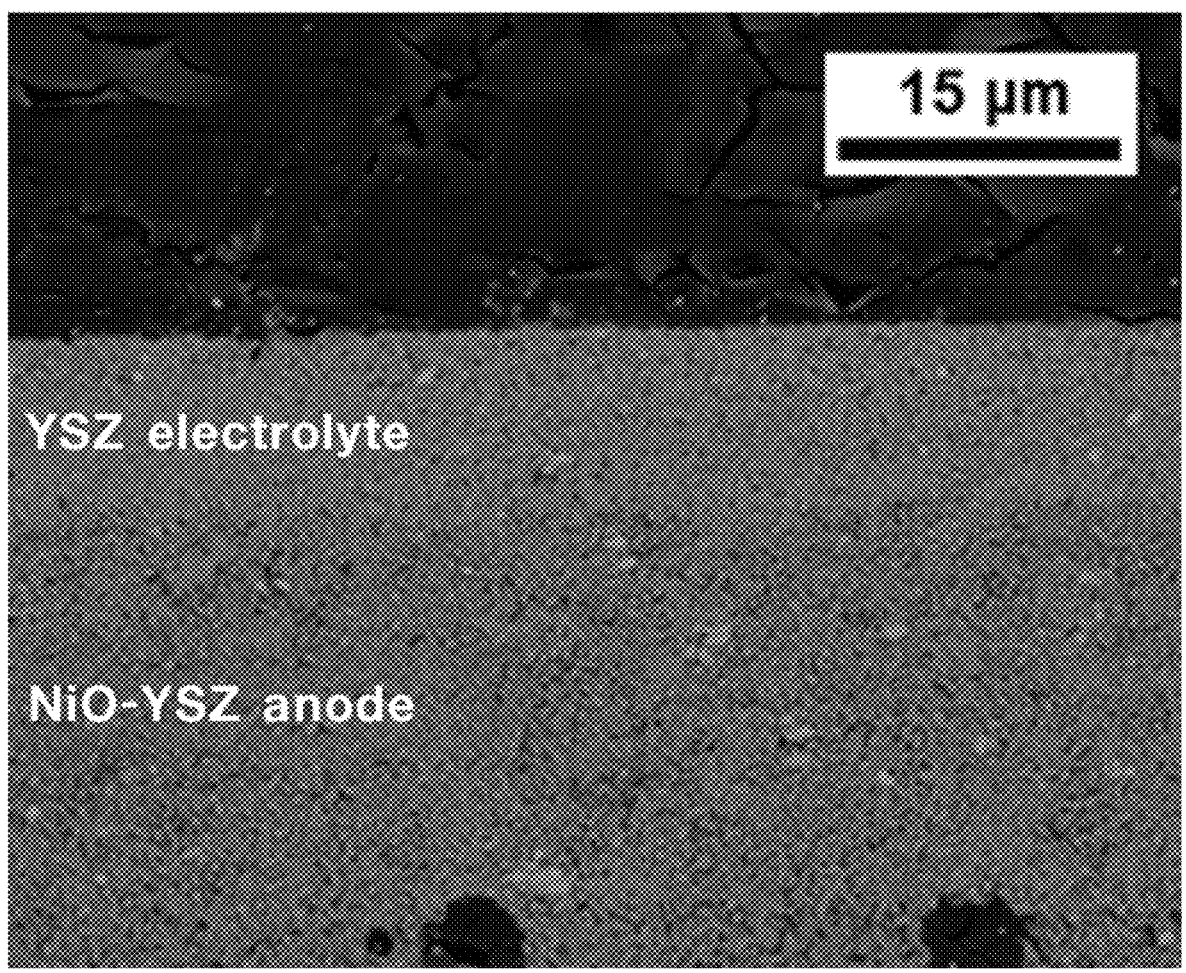
FIG. 8 shows the result of scanning electron microscopy (SEM) on the cross section of an electrolyte substrate produced in Example according to the present invention.

Scanning electron microscopy (SEM) was performed on the cross section of the electrolyte substrate (anode-electrolyte layer) prepared in Example above. The result is shown in FIG. 8. As can be seen from FIG. 8, no interface defect is found between the anode and the electrolyte layer.

Figure 9A:
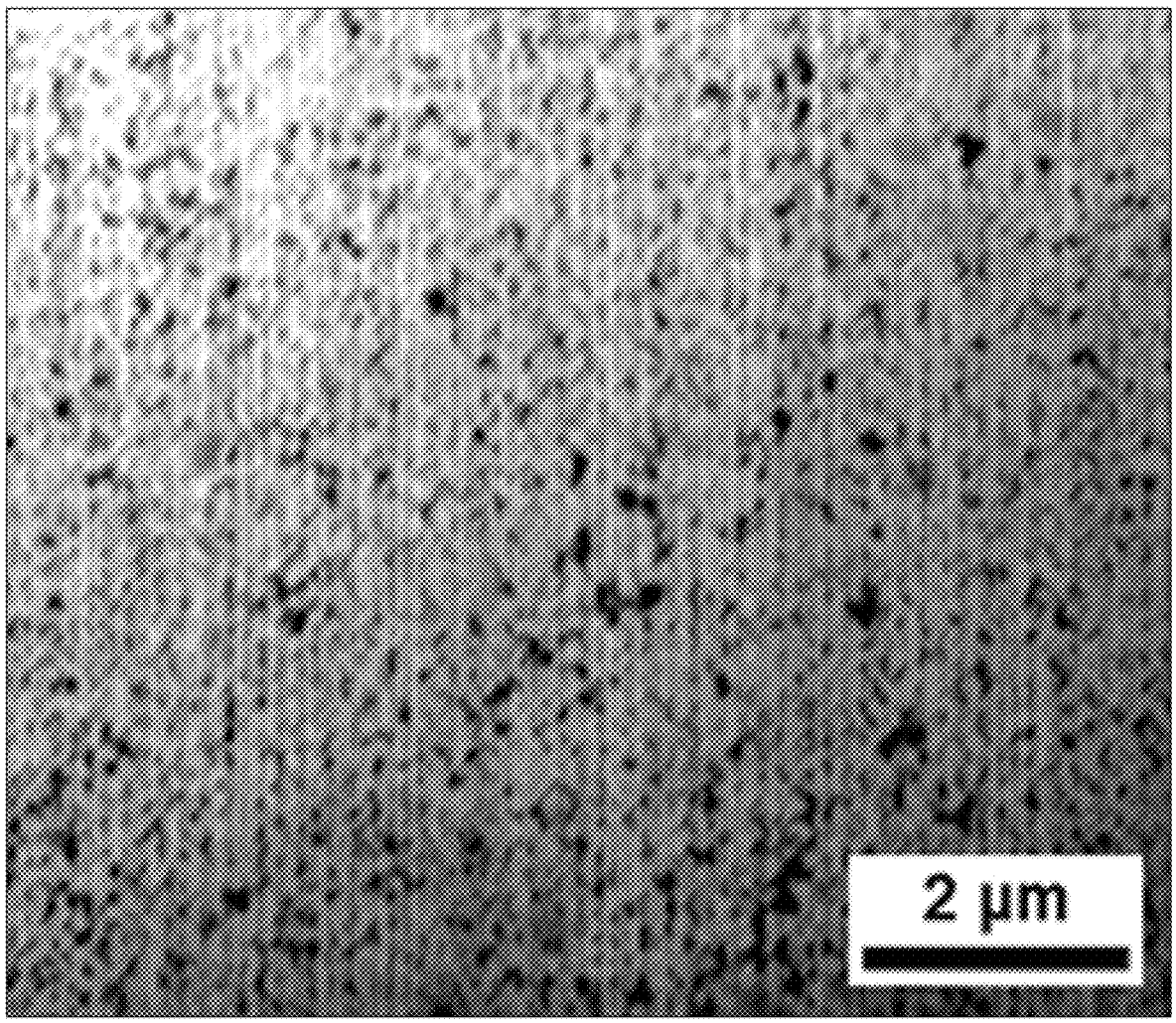
FIG. 9A shows a cross-sectional microstructure of an electrolyte layer of the electrolyte substrate produced in Example according to the present invention obtained by FIB (focused-ion beam) milling.
Figure 9B:
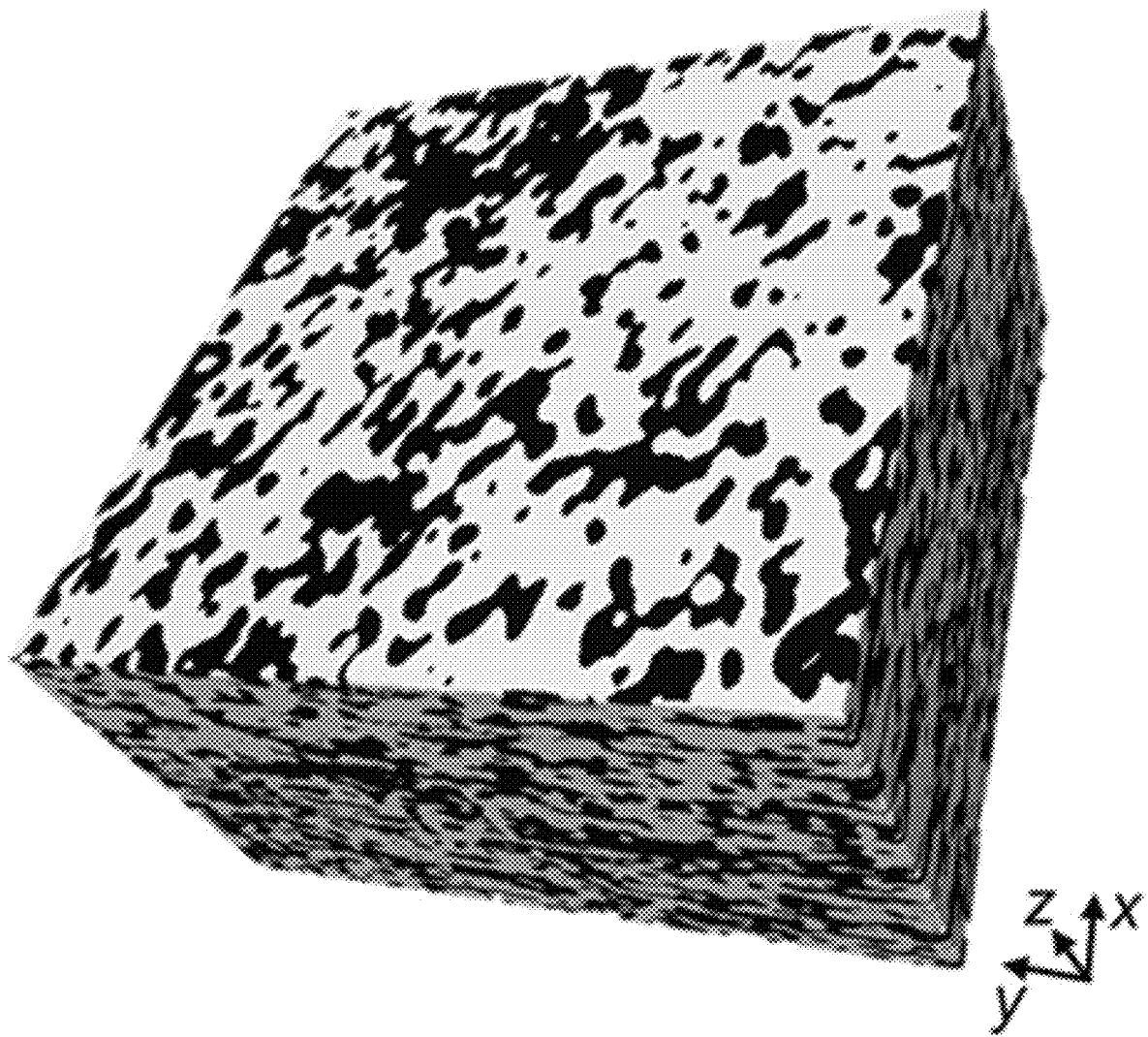
FIG. 9B shows the microstructure of an electrolyte layer three-dimensionally reconstructed by stacking 140 cross-sectional images of the electrolyte layer of the electrolyte substrate produced in Example according to the present invention.

FIG. 9A shows a cross-sectional microstructure of the electrolyte layer of the electrolyte substrate produced in Example obtained by FIB (focused-ion beam) milling, and FIG. 9B shows the microstructure of the electrolyte layer three-dimensionally reconstructed by stacking 140 cross-sectional images of the electrolyte layer of the electrolyte substrate produced in Example. In FIG. 9B, the white area corresponds to yttria-stabilized zirconia (YSZ) and the black areas correspond to pores.

Figure 10A:
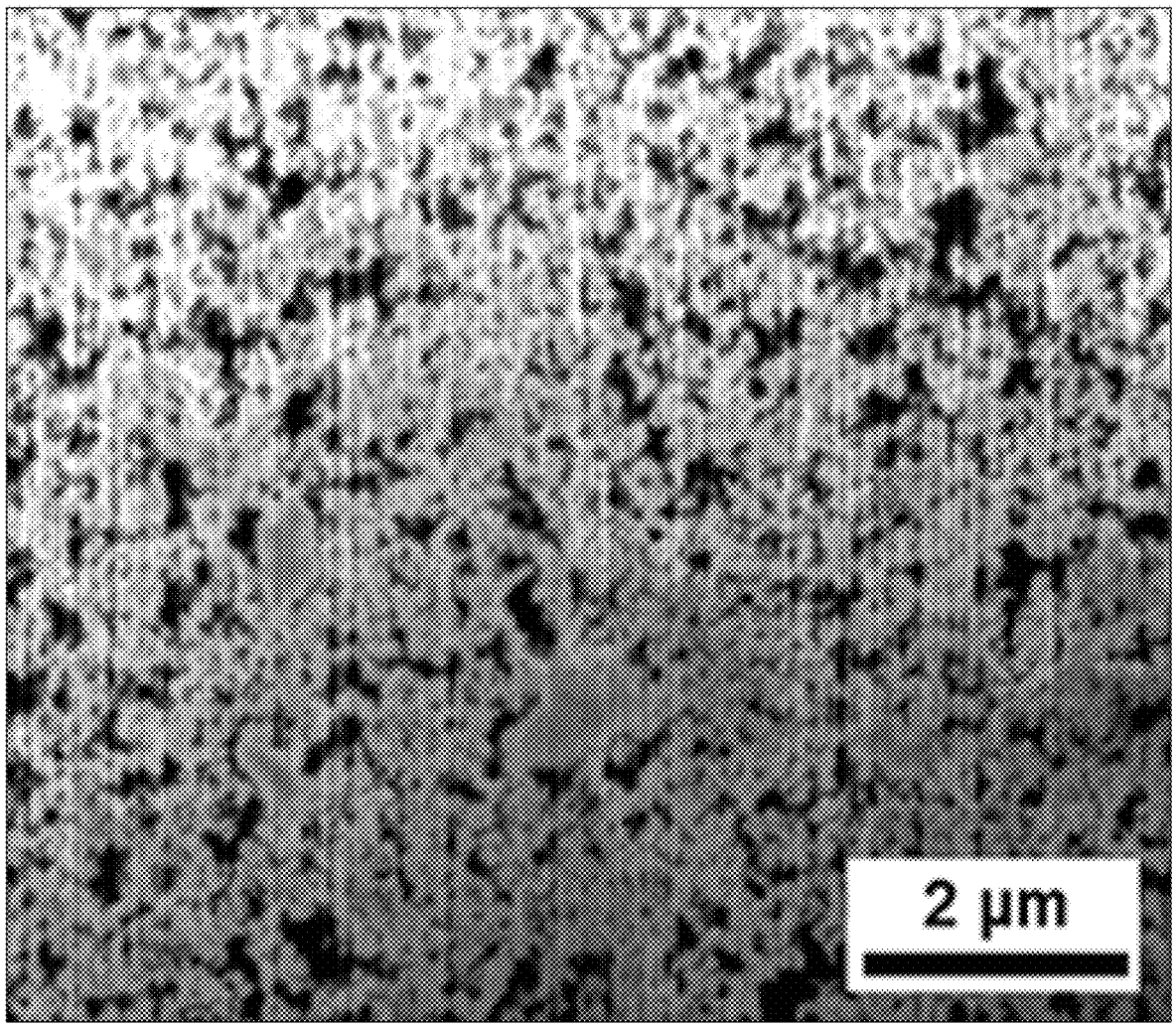
FIG. 10A shows a cross-sectional microstructure of the electrolyte layer of the electrolyte substrate produced in Comparative Example obtained by FIB (focused-ion beam) milling.
Figure 10B:
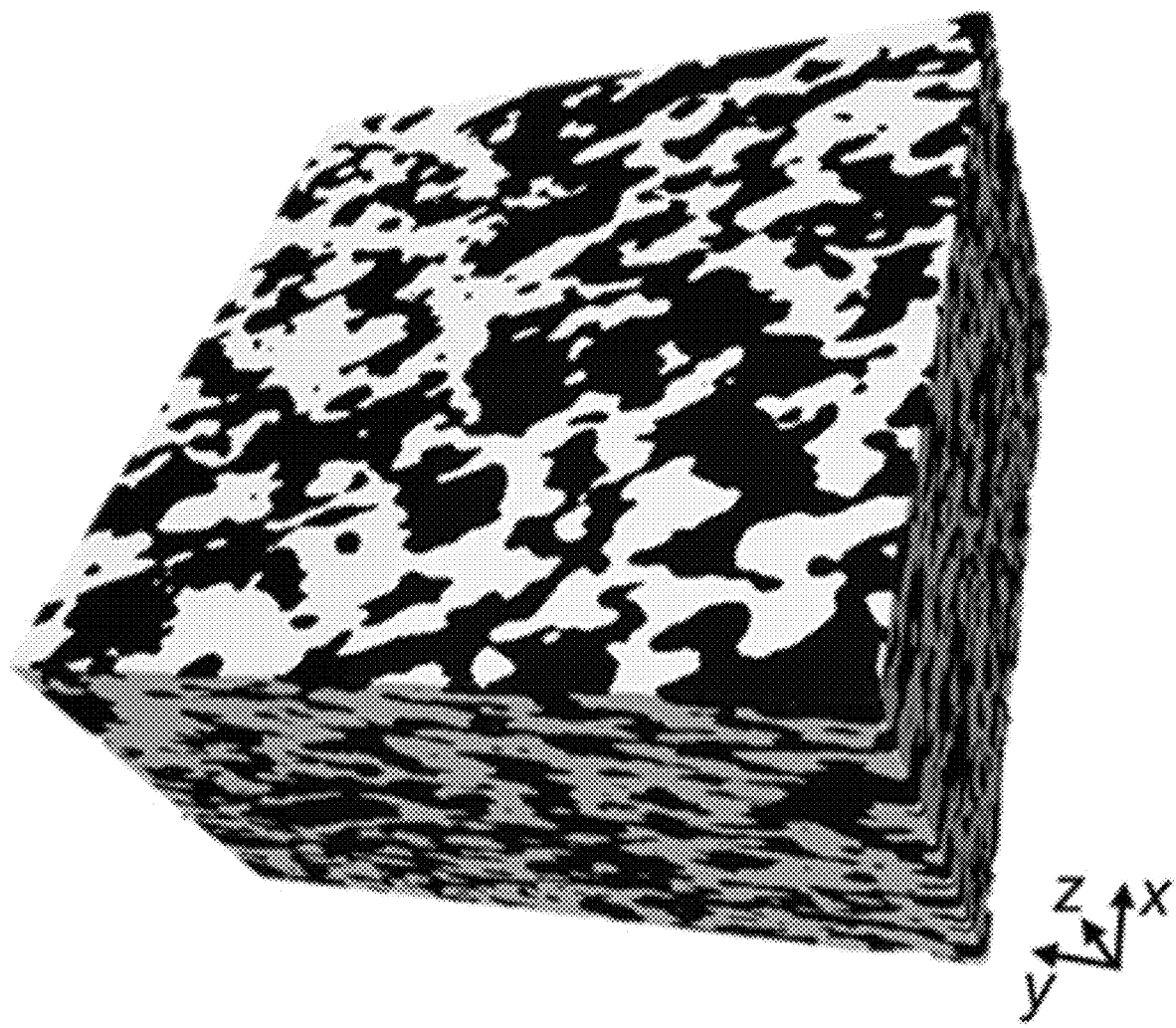
FIG. 10B shows the microstructure of an electrolyte layer three-dimensionally reconstructed by stacking 140 cross-sectional images of the electrolyte layer of the electrolyte substrate produced in Comparative Example.

FIG. 10A shows a cross-sectional microstructure of the electrolyte layer of the electrolyte substrate produced in Comparative Example obtained by FIB (focused-ion beam) milling and FIG. 10B shows the microstructure of the electrolyte layer three-dimensionally reconstructed by stacking 140 cross-sectional images of the electrolyte layer of the electrolyte substrate produced in Comparative Example. In FIG. 10B, the white area corresponds to yttria-stabilized zirconia (YSZ) and the black areas correspond to pores.

It was possible to obtain the following results from the above results.

The electrolyte layer of the electrolyte substrate produced in Example above exhibited a packing density of 53.3%, whereas the electrolyte layer of the electrolyte substrate produced in Comparative Example exhibited a packing density of 46.2%. In addition, the electrolyte layer of Example had a smaller pore size than the electrolyte layer of Comparative Example. Specifically, pores having a diameter of 200 nm or more were observed only in the electrolyte layer of Comparative Example.

Experimental Example 3

Figure 11A:
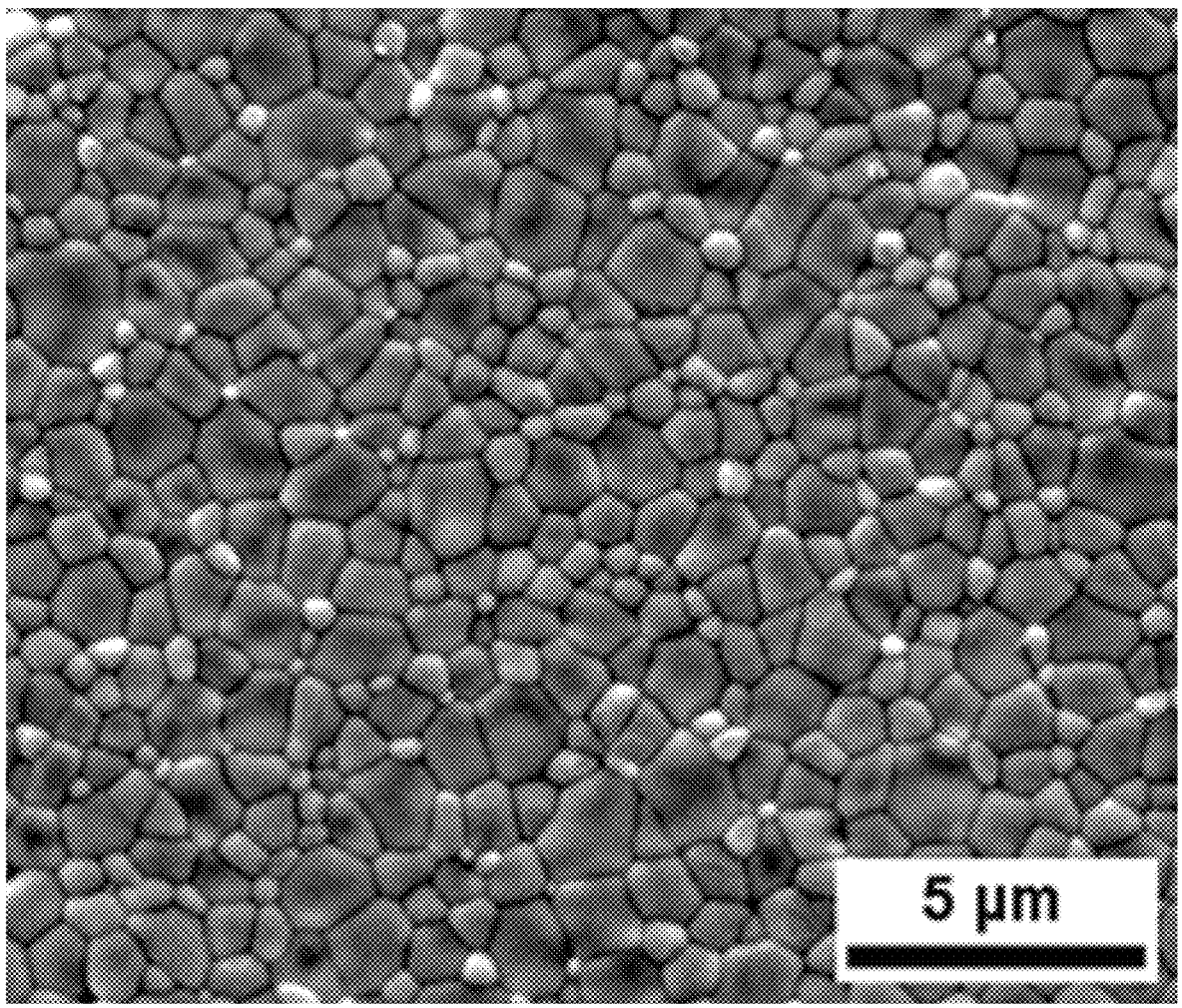
FIGS. 11A-11B show the result of scanning electron microscopy (SEM) on the sintered electrolyte substrate of Example, more particularly.

Scanning electron microscopy (SEM) was performed on the sintered electrolyte substrate of Example. FIG. 11A shows the result of SEM on the surface of the electrolyte layer included in the electrolyte substrate and FIG. 11B shows the result of SEM on the cross-section of the electrolyte substrate.

Figure 12A:
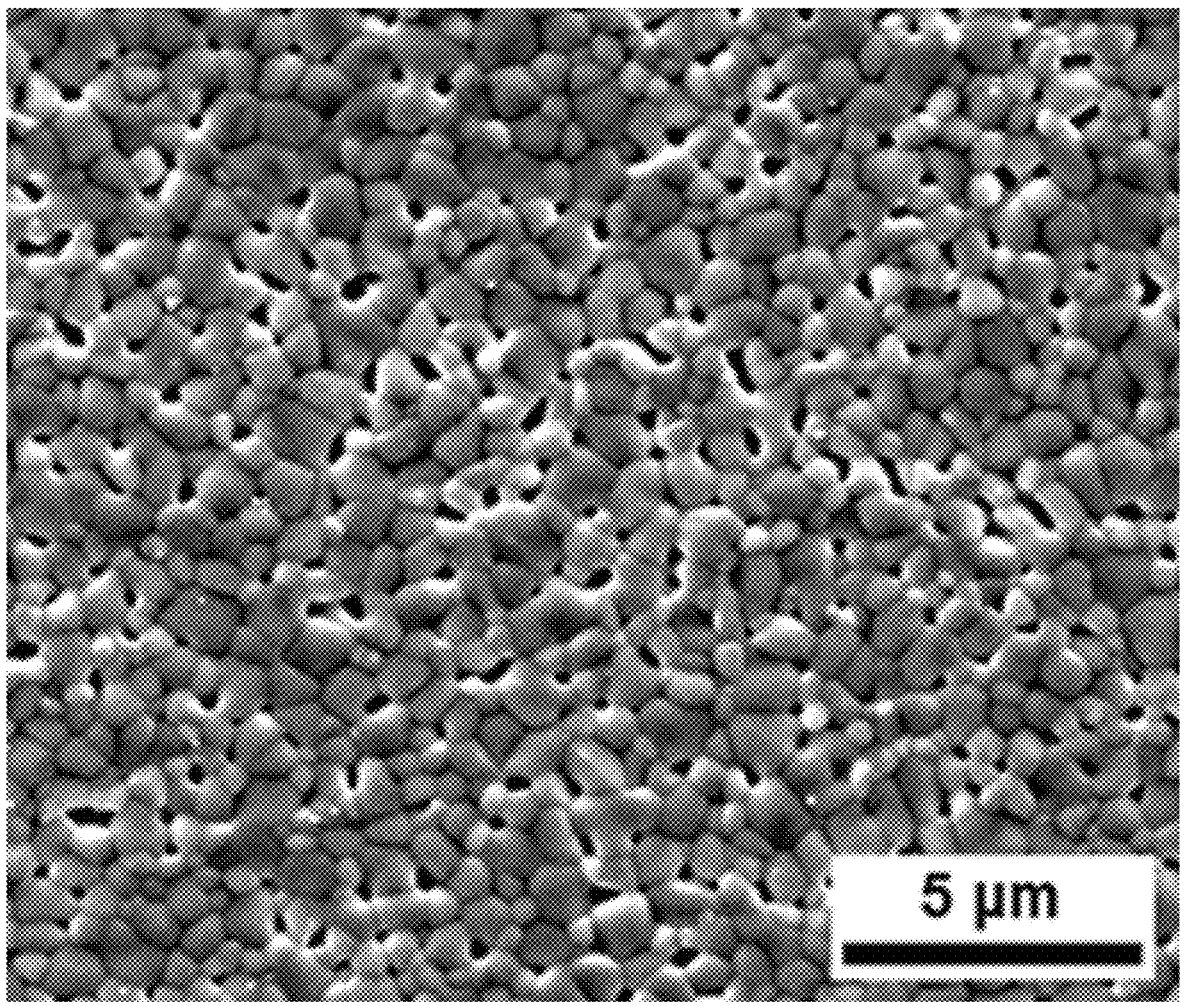
FIGS. 12A-12B show the result of scanning electron microscopy (SEM) on the sintered electrolyte substrate of Comparative Example, more particularly.
Figure 12B:
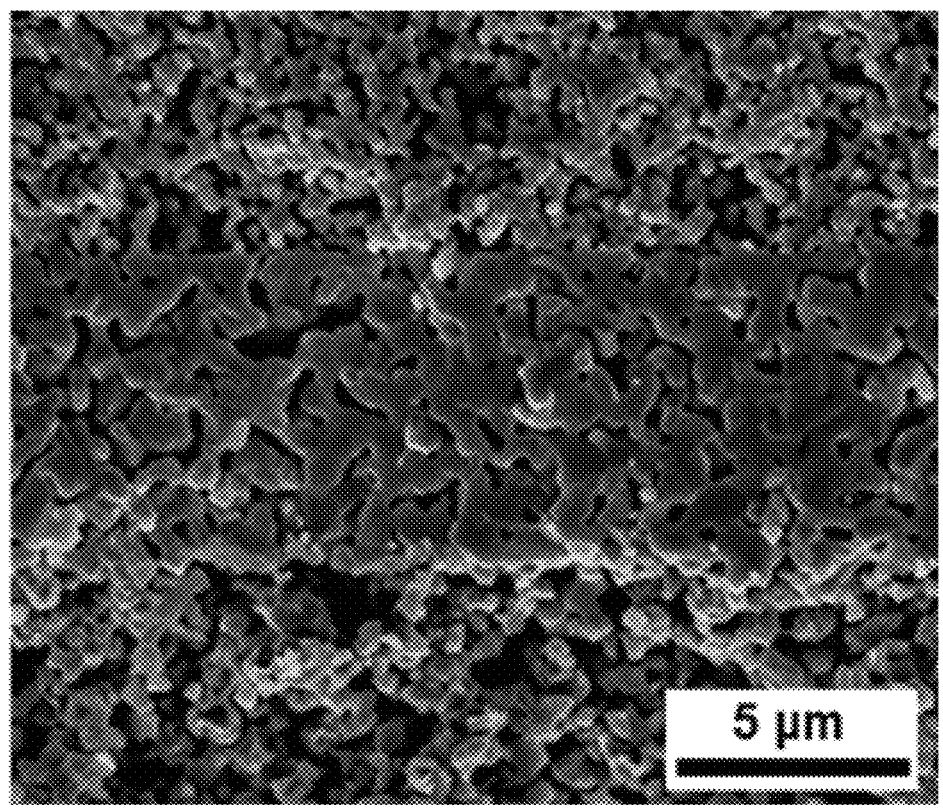

Scanning electron microscopy (SEM) was performed on the sintered electrolyte substrate in Comparative Example. FIG. 12A shows the result of SEM on the surface of the electrolyte layer included in the electrolyte substrate, and FIG. 12B shows the result of SEM on the cross-section of the electrolyte substrate.

Figure 11B:
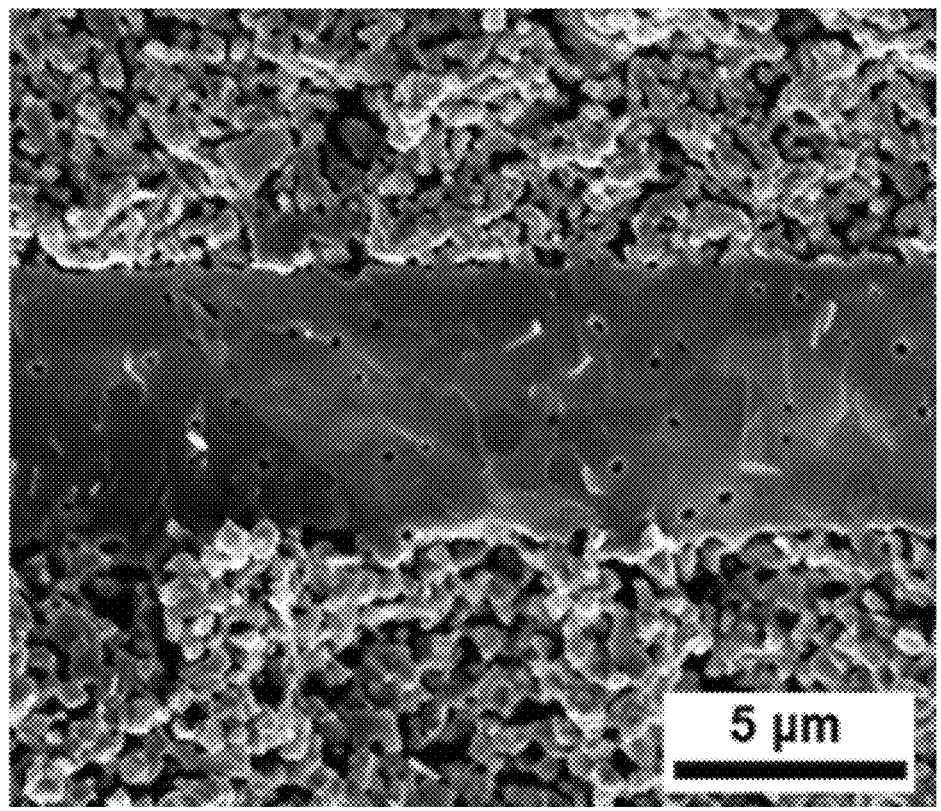

As can be seen from FIGS. 11A and 11B, the electrolyte substrate of Example exhibits a dense surface structure and a cross-sectional structure after sintering. On the other hand, as can be seen from FIGS. 12A and 12B, the electrolyte substrate of Comparative Example was not structurally dense enough to physically prevent the mutual penetration of hydrogen supplied to the anode and oxygen supplied to the cathode, which is the opposite electrode.

This means that the shear stress should be applied through a calendering process, as in the present invention, in order to increase the packing density before sintering and eliminate relatively large-sized pores, for the purpose of effectively lowering the sintering temperature.

Experimental Example 4

The performance of the solid oxide fuel cells according to Example and Comparative Example was evaluated. Specifically, Pt mesh and Ni foam were used to collect current on the cathode and anode, respectively. The sealing material used herein was a glassy compression sealing material. A load of 10 kg was applied in a vertical direction for current collection and sealing. Fuel ($H_2$) and air were each supplied at 200 sccm. The electrochemical performance was evaluated by measuring a current-voltage change at 700° C. The result is shown in FIG. 13.

Figure 13:
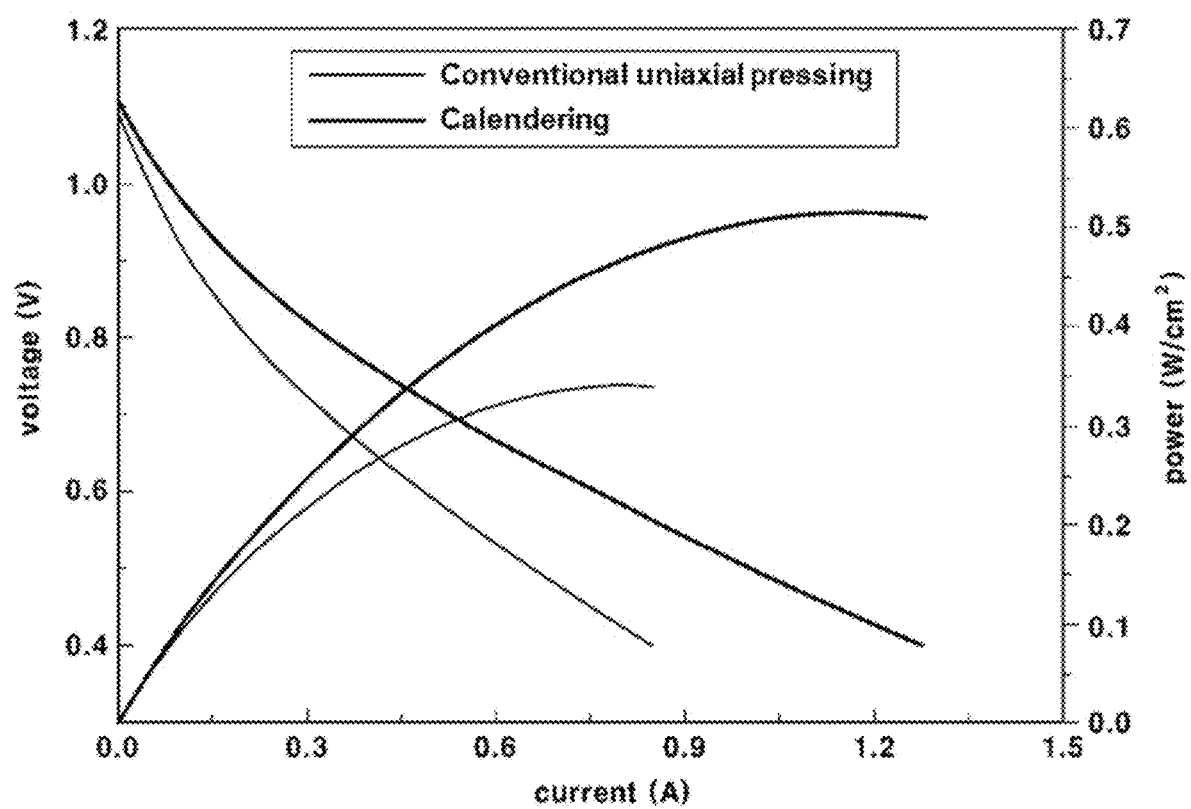
FIG. 13 shows the result of evaluation of the performance of solid oxide fuel cells according to Example according to the present invention and Comparative Example.

As can be seen from FIG. 13, the solid oxide fuel cell according to Example exhibited an improvement of about 50% in electrochemical performance compared to Comparative Example. The reason for this is that the solid oxide fuel cell according to Example has better interface connectivity between the anode and the electrolyte layer and thus has lower interface resistance, and is sintered at a relatively low temperature and thus has smoother reactive gas diffusion and a wider reactive area than Comparative Example.

As is apparent from the foregoing, the solid oxide fuel cell manufactured by the method according to the present invention is free of interface defects and has a uniform packing structure, thereby greatly improving the production yield and power density.

In addition, the method for manufacturing a solid oxide fuel cell according to the present invention is a continuous process, thus providing high productivity and maximizing facility investment and processing costs.

The effects of the present invention are not limited to those mentioned above. It should be understood that the effects of the present invention include all effects that can be inferred from the description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a solid oxide fuel cell comprising:
    preparing a stack comprising at least one anode support layer and at least one anode functional layer;
    stacking a protective layer on at least one surface of the stack; and
    calendering the stack with the protective layer to obtain an anode,
    wherein the anode is obtained by calendering the stack with the protective layer under the following conditions: calendering rollers have a nip gap not less than 99% and less than 100% of a thickness of the stack with the protective layer.

2. The method according to claim 1, wherein the anode support layer comprises a sheet obtained by tape-casting a slurry comprising at least nickel oxide (NiO), yttria-stabilized zirconia (YSZ) and a pore-forming agent.

3. The method according to claim 1, wherein the anode functional layer comprises a sheet obtained by tape-casting a slurry comprising at least nickel oxide (NiO) and yttria-stabilized zirconia (YSZ).

4. The method according to claim 1, wherein the stack comprises:
    five to ten anode support layers including the anode support layer; and at least one anode functional layer disposed on the anode support layers.

5. The method according to claim 1, wherein the anode is obtained by calendering the stack under the following conditions:
    the calendering rollers have a temperature of 60 to 90° C.; and the calendering rollers have a diameter of 100 mm to 150 mm.

6. The method according to claim 1, wherein the anode is obtained by calendering the stack at least two times.

7. The method according to claim 1, further comprising:
    stacking an electrolyte layer on the anode to obtain an assembly; and
    calendering the assembly to obtain an electrolyte substrate.

8. The method according to claim 7, wherein the electrolyte layer comprises a sheet obtained by tape-casting a slurry comprising yttria-stabilized zirconia (YSZ).

9. The method according to claim 7, wherein the electrolyte substrate is obtained by calendering the assembly under the following conditions:
    calendering rollers have a nip gap not less than 90% and less than 95% of a thickness of the assembly; and the calendering rollers have a rotational speed of 8 times or more per minute.

10. The method according to claim 9, wherein the electrolyte substrate is obtained by calendering the assembly under the following conditions: the calendering rollers have a temperature of 60 to 90° C.; and the calendering
rollers have a diameter of 100 mm to 150 mm.

11. The method according to claim 7, further comprising:
sintering the electrolyte substrate.

12. The method according to claim 11, wherein the electrolyte substrate is sintered at 1,200 to 1,300° C.

13. The method according to claim 11, wherein the anode of the electrolyte substrate has a thickness of 0.6 mm to 1.0 mm and the electrolyte layer has a thickness of 3 μm to 10 μm.

14. The method according to claim 7, further comprising:
forming a cathode on the electrolyte layer of the electrolyte substrate.

* * * * *